March 8, 1932. V. BENDIX 1,848,457
BRAKE TESTING APPARATUS
Filed Sept. 27, 1928  3 Sheets-Sheet 2

INVENTOR
Vincent Bendix
BY
M. W. McConkey
ATTORNEY

March 8, 1932. V. BENDIX 1,848,457
BRAKE TESTING APPARATUS
Filed Sept. 27, 1928 3 Sheets-Sheet 3

INVENTOR
Vincent Bendix
BY
ATTORNEY

Patented Mar. 8, 1932

1,848,457

UNITED STATES PATENT OFFICE

VINCENT BENDIX, OF CHICAGO, ILLINOIS, ASSIGNOR TO NATIONAL BRAKE SERVICE, INC., OF CHICAGO, ILLINOIS, A CORPORATION OF ILLINOIS

BRAKE-TESTING APPARATUS

Application filed September 27, 1928. Serial No. 308,745.

This invention relates to the testing of brakes, and is illustrated as embodied in a novel apparatus for testing four-wheel automobile brakes. Among the more important features of the invention may be enumerated (1) the use of band-like devices, preferably of the caterpillar tread variety, for driving at least two wheels against their brakes, so that no adjustment need be made for automobiles of different wheel-bases; (2) an arrangement of parts giving an unobstructed space beneath the car to facilitate work on the brake operating mechanism beneath the car; and (3) a novel device for holding the automobile during the testing of the brakes.

These and other features, including various novel arrangements and desirable particular constructions, will be apparent from the following description of one illustrative embodiment shown in the accompanying drawings, in which.

Figure 1:
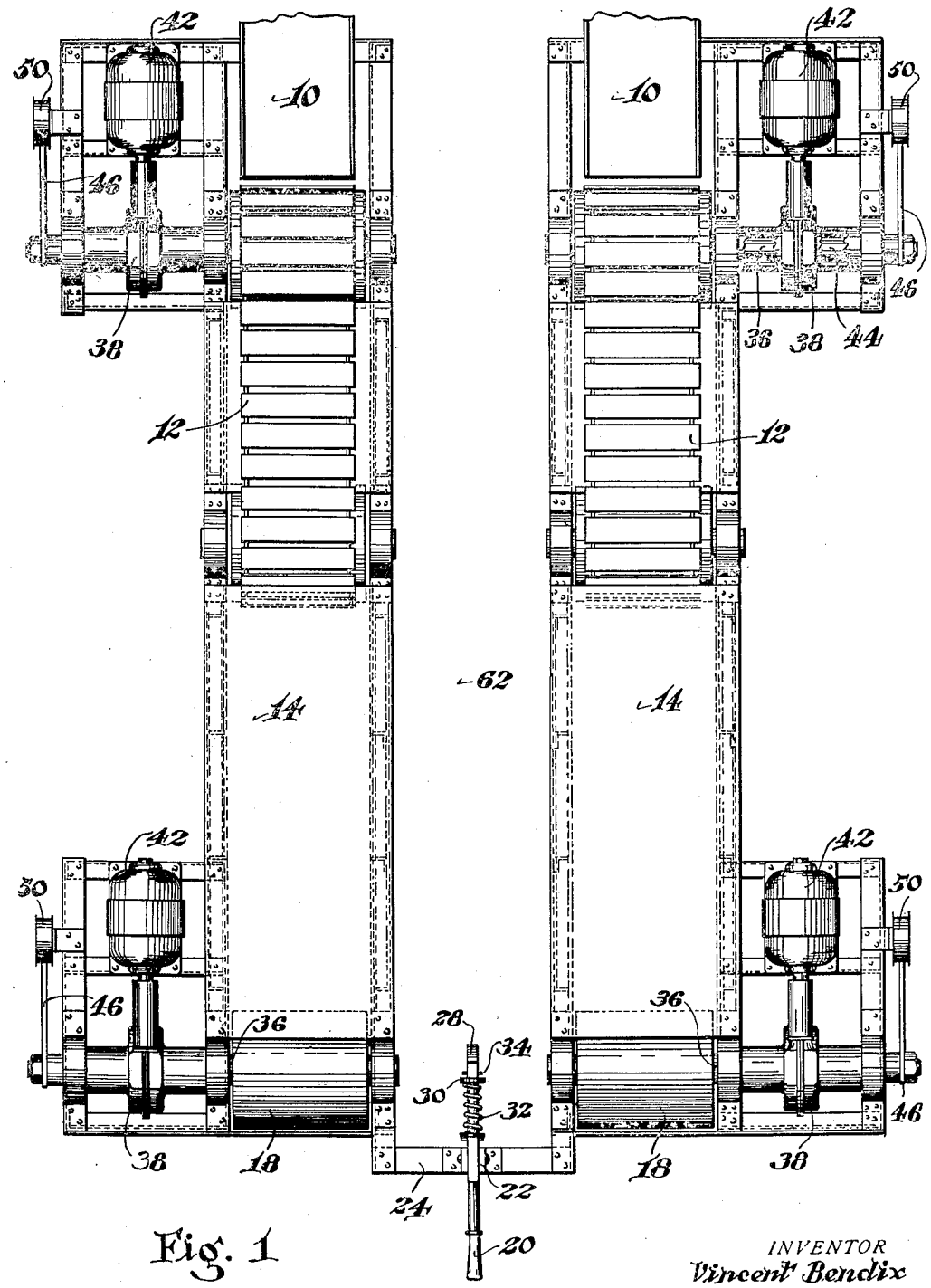
Figure 1 is a top plan view of the apparatus.

The apparatus, in the illustrated embodiment, includes a pair of suitable inclined ramps 10 up which the automobile may be driven, and from which the wheels of the automobile roll onto a pair of band-like wheel-driving devices 12, of a novel caterpillar type. The front wheels are carried from these band-like devices 12, over stationary ways 14 carried by suitable frame-work 16, onto wheel-driving rollers 18.

Figure 2:
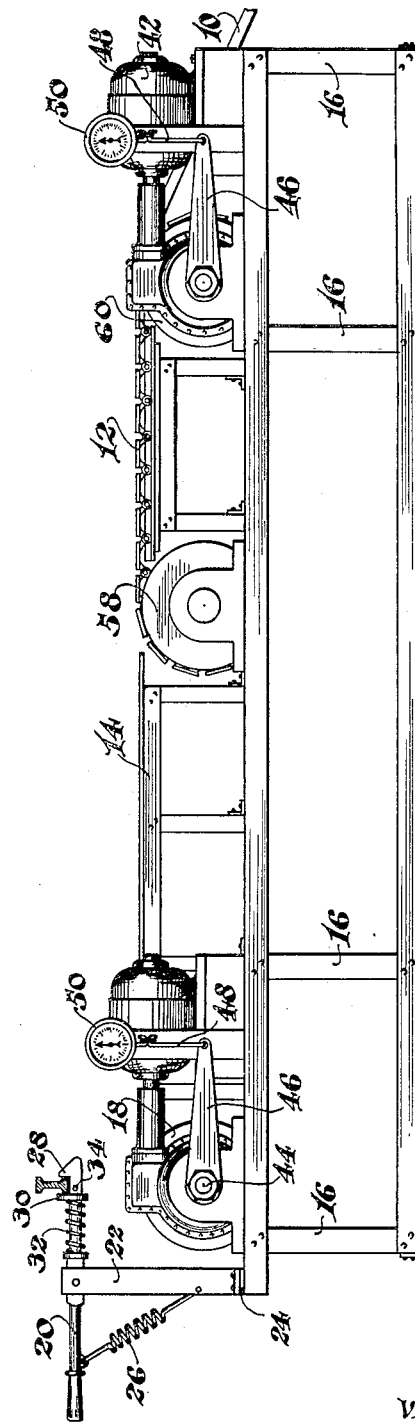
Figure 2 is a side elevation of the apparatus.
Figure 3:
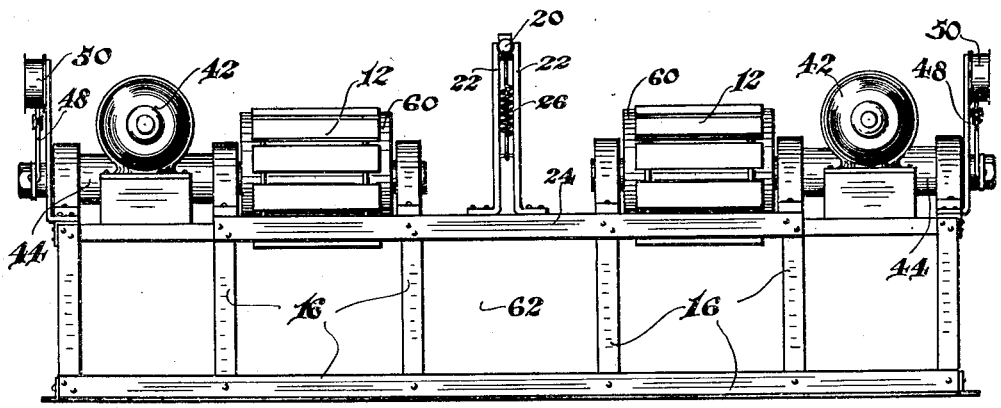
Figure 3 is an end elevation of the apparatus, looking downwardly from the upper end of Figure 1, but with the ramps omitted.

When the front wheels reach their final position on rollers 18, the automobile is automatically engaged and held by novel means such as a catch including a lever 20 pivoted on a supporting standard 22 carried by a bar extending across the front of the apparatus. The front end or nose of lever 20 is beveled to form a wedge which is forced down by the axle in its forward movement, against the resistance of a spring 26 tensioned between the support 22 and the lever. The lever is cut away to form a fixed abutment or hook 28 engaging one side of the axle, and is provided with a collar 30 pressed by a spring 32 toward a cross-pin 34 forming a fixed stop. Collar 30 forms an elastic stop to engage the front edge of the front axle of the car to be tested and through the resiliency of spring 32 return the axle to a position abutting the straight edge of hook 28, in which position the front wheels of the car will be in tread engagement with rollers 18. The axle is released, after testing the brakes, by pulling up on the left-hand end of lever 20 in Figure 2.

Each of rollers 18 is driven by a shaft 36 from a differential 38, the casing of which has a worm gear driven by a worm 40 from a source of power such as an electric motor 42. The other shaft 44 of the differential, arranged in the usual manner in end to end alinement with respect to shaft 36, has an arm 46 connected by a link 48 to a measuring and indicating device 50 of the spring-scale type.

Figure 5:
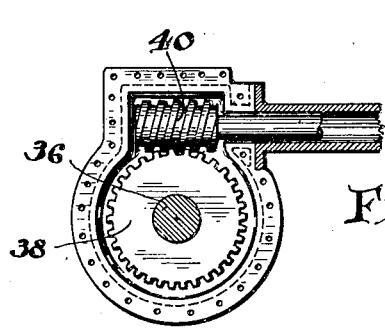
Figure 5 is a section through the driving mechanism adjacent one of the differentials.
Figure 6:
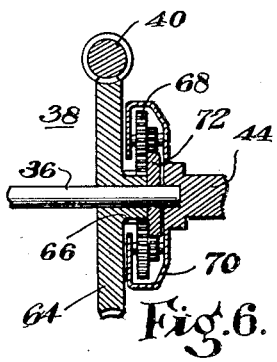
Figure 6 is a sectional view through the driving mechanism taken at right angles to the plane of Figure 5.

The differential gear illustrated in Figures 5 and 6 is preferably of the planetary type and comprises a worm gear 64 rotatably mounted on shaft 36 and having an integral sun gear 66 meshing with the step gear 68 rotatably mounted in and carried by the casing 70. The smaller spur gear portion of the step gear 68 is meshed with spur gear 72, that is, keyed to shaft 36. Casing 70 is secured to the shaft 44 within the end of which is a bearing for the projecting end portion of shaft 36. Rotation of the worm 40 applies a turning moment to both shaft 36 and casing 70 but in the embodiment shown, shaft 44 is yieldingly held against rotation by the indicating device 50 and motion for driving the rolls is transmitted entirely through shaft 36.

Figure 4:
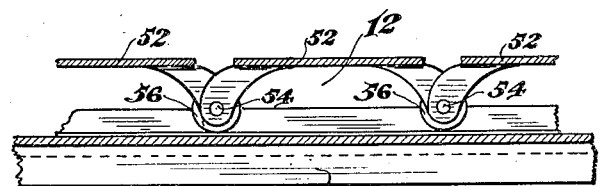
Figure 4 is a detail sectional view through a portion of one of the band-like caterpillar tread driving devices.

The novel caterpillar driving devices 12 are shown as including a series of tread plates 52 (Fig. 4) connected by pivots 54 having rollers 56 seated on tracks or ways formed on the frame 16. These devices run over drums or pulleys 58 and 60, the latter being driven as described for rollers 18. Thus the rear wheels may rest anywhere on the belt-like devices 12, and it is not necessary to adjust the apparatus for testing automobiles having different wheelbases.

It is important to note that there is an entirely unobstructed space 62 between the sides of the apparatus, and extending the full length of the apparatus except for the cross bar 24, support 22, and lever 20 at the front end of the apparatus. This greatly facilitates work beneath the car.

While one illustrative embodiment has been described in detail, it is not my intention to limit the scope of the invention to that particular embodiment, or otherwise than by the terms of the appended claims.

I claim:

1. Apparatus for testing the brakes of an automobile comprising, in combination, four devices including driving shafts and concentric housings therefor for rotating the four wheels of the automobile independently of each other against the resistance of their respective brakes, and means connected with the housings for measuring independently the forces necessary to drive said devices and to show the resistances of the several brakes, at least two of said devices including relatively long belt-like members engaging wheels on opposite sides of the automobile so that the four wheels are operatively engaged without adjusting the apparatus for the varying wheelbases of different automobiles.

2. Apparatus for testing the brakes of an automobile comprising, in combination, four devices including differential gears having housings for rotating the four wheels of the automobile independently of each other against the resistance of their respective brakes, and means connected with the differential gear housings for measuring independently the forces necessary to drive said devices and to show the resistances of the several brakes, two of said devices including relatively long belt-like members engaging wheels on opposite sides of the automobile so that the four wheels are operatively engaged without adjusting the apparatus for the varying wheelbases of different automobiles and the other devices comprising wheel-supporting rollers.

3. Brake-testing apparatus comprising, in combination, a pair of shafts arranged generally end to end and connected by a differential, power means for driving the differential, wheel-rotating means, driven by one of said shafts, and measuring and indicating means directly connected to the other of said shafts and yieldingly resisting rotation of said other shaft.

4. Brake-testing apparatus comprising, in combination, a pair of shafts arranged generally end to end and connected by a differential, a motor geared to the differential, wheel-rotating means driven by one of said shafts, and measuring and indicating means directly connected to the other of said shafts and yieldingly resisting rotation of said other shaft.

5. Brake-testing apparatus comprising, in combination, means upon which an automobile may be driven and which supports the automobile wheel, and a shock absorbing latch device automatically operated by driving the automobile into place and which engages and holds the front axle of the automobile.

6. Brake-testing apparatus comprising, in combination, means upon which an automobile may be driven and which supports the automobile wheel, and latch device automatically operated by driving the automobile into place having a resilient thrust absorbing member and which engages and holds a part of the automobile.

7. An automobile-holding device comprising, in combination, a pivoted lever having an axle-gripping means at one end, said means including relatively slidable jaws, and a spring yieldingly urging the lever toward axle-gripping position, the lever being beveled to be wedged against the resistance of the spring by movement of an axle thereagainst and then to be moved back by said spring to grip the axle.

8. An automobile-holding device comprising, in combination, a pivoted lever having a fixed shoulder and a yieldingly-operated collar forming axle-gripping means, and a spring yieldingly urging the lever toward axle-gripping position, the lever being beveled to be wedged against the resistance of the spring by movement of an axle thereagainst and then to be moved back by said spring to grip the axle.

9. In a brake testing device, the combination of a frame adapted to support a vehicle and a vehicle securing latch having a resilient abutment mounted thereon.

10. In a brake testing device, the combination of a frame adapted to support a vehicle, and a vehicle securing latch having a pair of relatively movable jaws, one of which is resiliently urged toward the other.

In testimony whereof, I have hereunto signed my name.

VINCENT BENDIX.